United States Patent [19]
Brown

[11] 3,967,497
[45] July 6, 1976

[54] VIBRATING FORCE SENSOR
[76] Inventor: Horace D. Brown, 9817 SW. 93rd Terrace, Miami, Fla. 33176
[22] Filed: Dec. 16, 1974
[21] Appl. No.: 533,345

[52] U.S. Cl. ............................ 73/141 R; 73/DIG. 1; 177/210
[51] Int. Cl.² ................................................ G01L 1/10
[58] Field of Search ...... 73/141 R, DIG. 1, 517 AV; 177/210

[56] References Cited
UNITED STATES PATENTS
2,305,783  12/1942  Heymann et al. ........................ 177/1
3,319,472  5/1967  Reefman ......................... 73/517 AV
3,486,383  12/1969  Riordan ........................... 73/DIG. 1

Primary Examiner—James J. Gill
Assistant Examiner—Anthony V. Ciarlante

[57] ABSTRACT

A force sensing device in which the oscillations of a vibrator are damped by applying a weight, force, which is to be measured directly against a vibrating element. The output of a transducer, which converts the vibrator's motions into an electric signal, is fed into a readout instrument, recorder, or computer for observation and evaluation.

1 Claim, 10 Drawing Figures

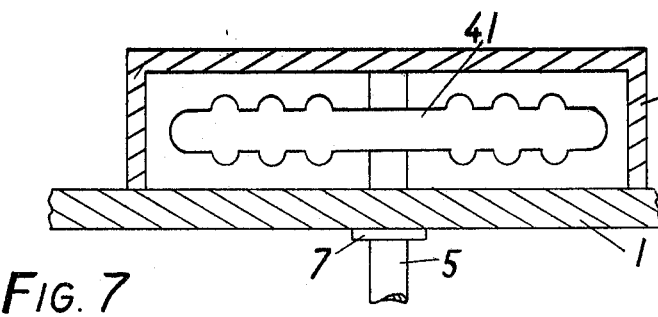
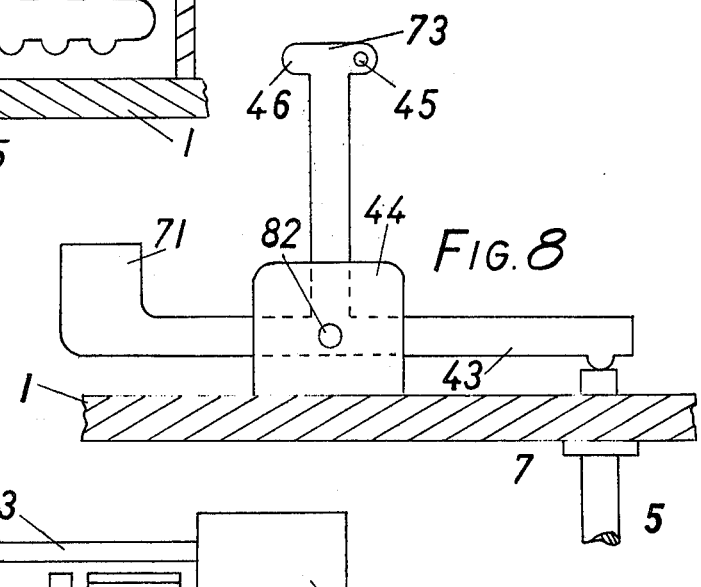
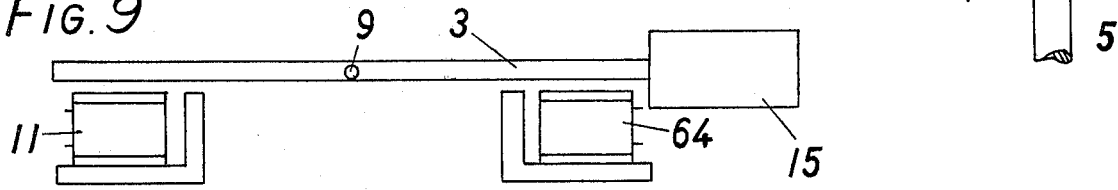
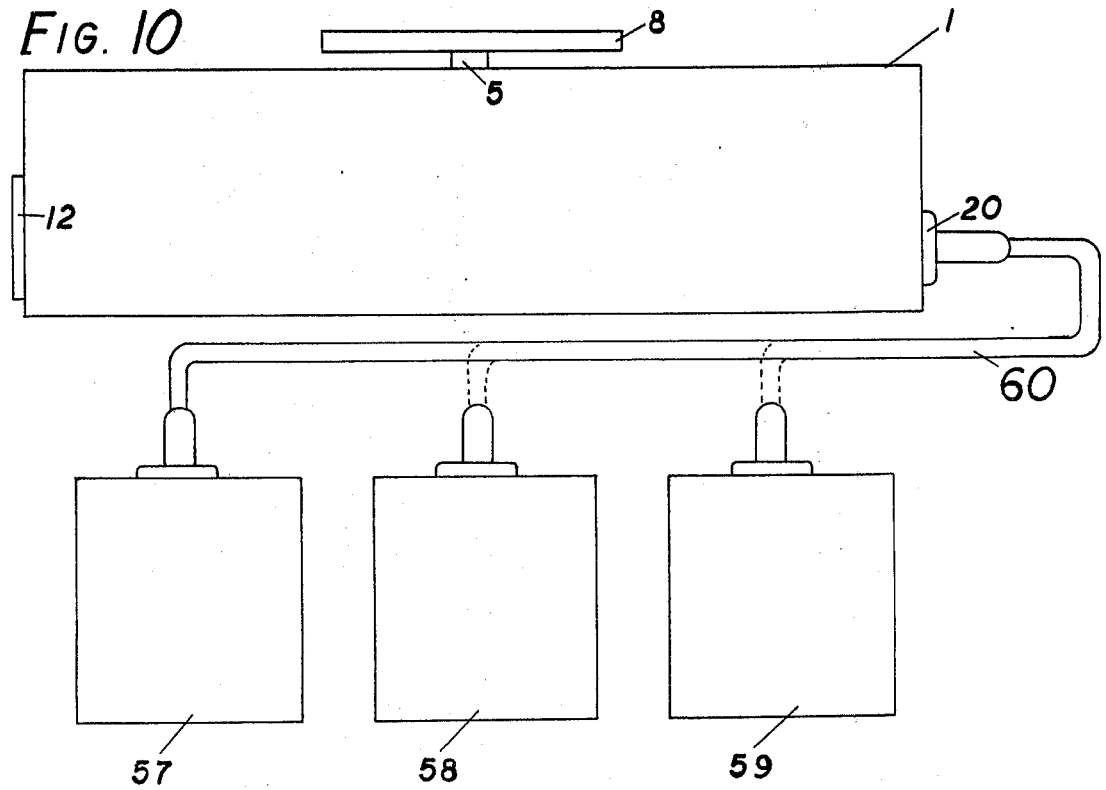

VIBRATING FORCE SENSOR

The invention relates to weighing devices and to force, stress, and pressure gauges, including barometers. Its basic components are a vibrator, an exciter or vibration generator, a transducer for converting the vibrator's motions into electrical impulses, readout means for visually indicating changes in the transducer's output, and means for applying a weight or force against the vibrator in a manner so as to damp the vibrator's oscillations.

One object of the invention is to provide a means for converting weight, force or pressure directly into an electric signal which can be visually indicated on a volt meter or other electric indicating equipment such as digital readout instruments, either locally or remotely, amplified, recorded, fed into a computer, or used to control other equipment.

Another object is to provide an economically feasible force measuring device which has a high degree of accuracy, and which can be constructed on a large or small scale, including miniature sizes which will reliably weigh extremely small, almost weightless articles, or measure minute forces.

Still another object is to provide a means for repeatable accuracy in the precise adjustment of spring tension in the mass production of spring loaded and spring controlled apparatus.

The cited objects, as well as numerous other objects and advantages of the present invention will become obvious from the following specification when taken in conjunction with the annexed drawing, in which:

FIG. 7 is a front elevation demonstration, in partial cross section showing, the adaptation of an anaroid barometer pressure box to the present invention.

FIG. 8 is also a front elevation, and demonstrates the application of push and pull forces to the force sensing post of this invention.

FIG. 9 is a detail of the balanced beam vibrator and illustrates how twin exciter coils may be used in special applications.

FIG. 10 is a block diagram illustrating a common method of connecting the present invention to indicating devices and other equipment.

Figure 1:
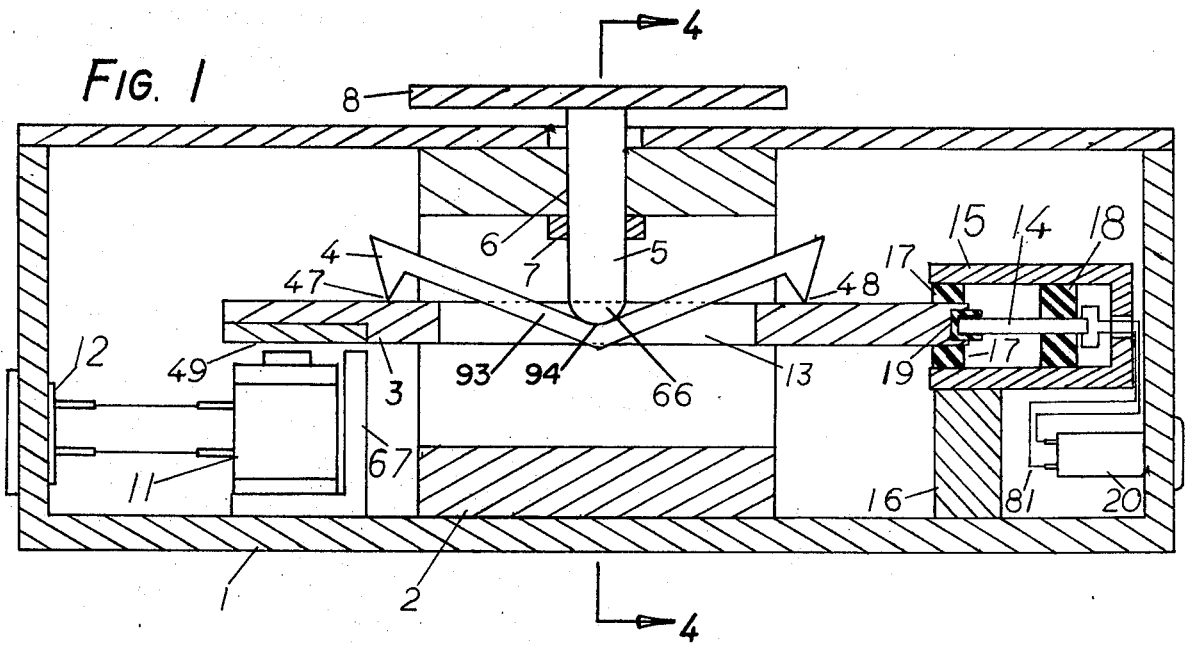
FIG. 1 is a general view in cross section through the front of the invention.

With greater reference to the drawing, wherein like numerals designate like parts throughout the several views, a frame 2, FIG. 1, is secured to a base housing 1. A balanced vibrator beam 3, FIGS. 1 and 4, hinges on shafts 9 and 10 via antifriction ball bearings 55 and 56, respectively. The beam 3 is made of a nonmagnetic substance, but integrally one with said beam is a magnetically responsive plate 49, FIG. 1, secured to the bottom left end thereof. Juxtaposed beneath plate 49 and fixedly attached to the base 1 is an electromagnet 11 which serves as an exciter coil or vibration generator. The two ends of the coil 11 terminate in a power input receptacle 12 mounted in the left side wall of housing 1. A transducer case 15 is secured to the top of a stud 16, said stud being anchored to the base 1. A piezoelectric crystal 14, which may be a natural quartz crystal or one of a variety of natural or synthetic piezoelectric substances, is supported at its right end within case 15 by a semiresilient block 18. The opposite end of the crystal 14 is coupled to the right end of the beam 3 by an interposing elastic bushing 19. The end of beam 3 is supported between the upper and lower inner walls of case 15 by resilient blocks 17.

With continued reference to FIG. 1, the exciter coil 11 may be energized by an AC or DC voltage source, although FIG. 1 illustrates an AC unit. When a common domestic AC voltage is applied to exciter coil 11, the consequent rising and falling of the magnetic field generated through frame 67 permeates the plate 49, causing, with each half cycle of the sine wave voltage, the magnetically responsive plate 49 to be drawn toward the electromagnet 11. As the sine wave voltage returns to zero the magnetic field collapses and releases the plate 49. When this occurs, the beam 3 returns to its normal, center position due to the centering support of the resilient blocks 17. The alternate pulling force of the magnet 11 against plate 49 and the constant centering effect of the resilient blocks 17 cause the balanced beam 3 to oscillate at a frequency and intensity corresponding to that of the applied voltage.

Since the beam 3 pivots at its center the oscillating motion generated in the left end thereof by the exciter will be transferred to the right end which is coupled to the piezoelectric crystal 14, thus causing the resiliently mounted crystal to vibrate in unison with the beam 3. The torsional motions thereby induced into the piezoelectric crystal 14 generate the well known phenomenon of piezoelectricity, and the voltage thus developed, corresponding in frequency and intensity to that of the vibrating beam 3 will be delivered to the output terminal 20 via the interconnecting pair of wires 81, and may be transmitted by additional interconnecting cables to a meter or other external equipment.

Figure 2:
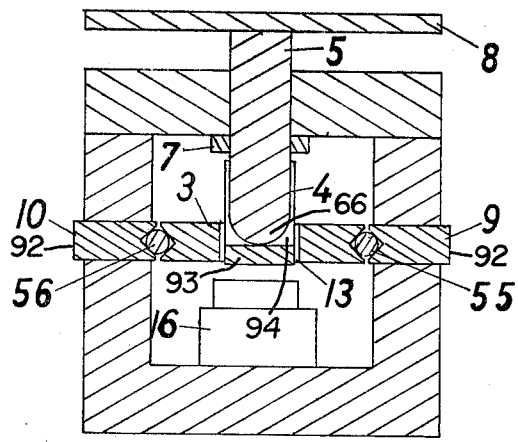
FIG. 2 is a vertical cross section through the balanced beam vibrator taken on the line 4—4 of FIG. 1.

A slot 13, FIGS. 1 and 2, centered in and parallel to beam 3 transverses the axis 92 of said beam. The vibrating beam 3 impinges against the two ends 47 and 48 of a yoke 4 which rides on the top surface of said beam. The center portion 93 of the yoke 4 is underslung through slot 13 so that its top center 94 coincides with the center of the beam's axis 92, the purpose of which will be detailed hereinafter. A post 5, having a table 8 on its top end, is loosely supported vertically by a bearing 6 in the top of frame 2. A retaining collar 7 secured to post 5 captivates the post between the yoke 4 and the top of frame 2. The bottom end 66 of post 5 is craddled in the top center 94 of the underslung portion 93 of yoke 4.

Figure 3:
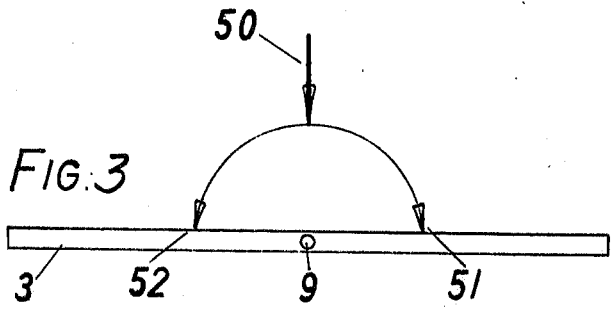
FIG. 3 is a diagramatic view of force as it is applied to the balanced, vibrating beam in the invention.
Figure 4:
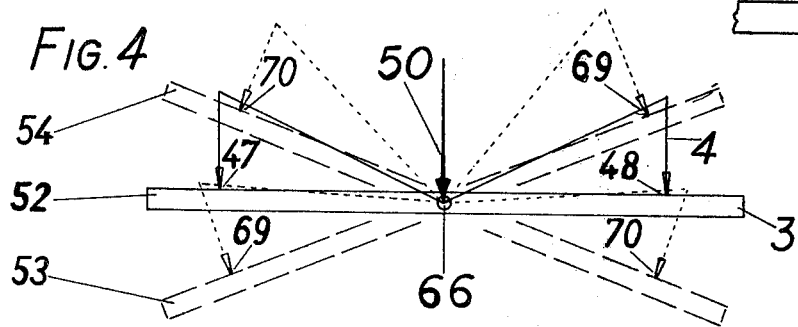
FIG. 4 is a progressive view of FIG. 3, showing, diagramatically, a force supporting yoke straddling the axis of the balanced beam vibrator.

FIG. 3 illustrates diagramatically how a force 50 is applied equally to the two sides 51 and 52 of beam 3. FIG. 4 carries the illustration of FIG. 3 a step further by adding the underslung yoke 4 of FIG. 1, in diagramatic form, and showing, in exaggeration, the oscillating motion of the balanced beam 3. When the beam 3 stands at center position 52 the yoke 4 rides at 47—48. When the beam swings counterclockwise 53, the two ends of the yoke 4 follow through to 69—69 while the top center 94 remains at the center of the pivot point of the beam 3. Then, as the beam 3 rocks clockwise 54 and the ends of the yoke ride at 70—70 the load 50 remains, via post 5, craddled motionless at the pivot point. But since the yoke does not contact the beam 3 at any point other than at the ends 47 and 48, the weight or force applied to post 5 is exerted against the two oscillating sides of the beam 3 and thereby damps or impedes the motions induced by the vibration generator 11, while the post 5 craddled in the center of yoke 4 remains motionless. It may be pointed out that this same motionless attribute could be achieved by the use of spherical yoke resembling the diagram in FIG. 3, but such a yoke would apply the force at a radius from the axis of the beam and would introduce friction which would adversely affect the sensitivity of the beam 3.

Referring again to FIG. 1, the operation of the invention may be visualized by the application of an AC voltage to the exciter coil 11. The beam 3 immediately begins to vibrate and its consequent impingement against the ends 47 and 48 of yoke 4 pivots the yoke in corresponding oscillations against the bottom end 66 of post 5, while the post itself is stationary. The transducer 14, now vibrating in unison with the beam 3 is delivering its maximum voltage output and registers a full scale reading on an appropriately calibrated indicating instrument. Now, by placing a weight on the table 8 a load will be imposed upon beam 3 at the yoke contact points 47 and 48 and the beam's oscillating motion will thereby be damped or restricted to a degree corresponding to the amount of the load. The output voltage of crystal 14 will vary accordingly, and will register on the indicating instrument, which may be scaled to indicate any appropriate unit value. The range of force which the device can measure obviously will depend on design dimensions and the strength of the vibration generator 11. For large scale models the twin exciter coils 11 and 64, FIG. 9, located at opposite ends of beam 3 and operated in push pull may be employed.

The post 5 is insensitive to the kind of force applied against it, and will therefore work equally well in the measurement of weight, pressure, tension, or stress, etc., and since the force is converted directly into an electric impulse, the signal may be transmitted to a remote point for indication.

FIG. 7 shows an anaroid barometer pressure box 41 of common variety, adapted to fit firmly between a frame 42 and the sensor post 5. In this configuration the barometer box would attempt to expand and contract in response to changes in the surrounding atmospheric pressure. The changes thus occuring within the pressure box would be exerted against the top of post 5, and would consequently register on the associated readout instrument, such as a weather barometer or altimeter.

FIG. 8 demonstrates the simplicity of applying common spring forces against the sensor post 5. A clevis 44 is anchored to the housing 1 and a lever 43, counterbalanced 71, is hinged within said clevis on pin 82. One end of lever 43 bears against the top of post 5 and the other end 73 stands vertically. A pull test may be performed by coupling the test item into the lever eye 45, or a force may be exerted against the abutment 46 for measurement, or to test for ability to constrain a force.

Figure 5:
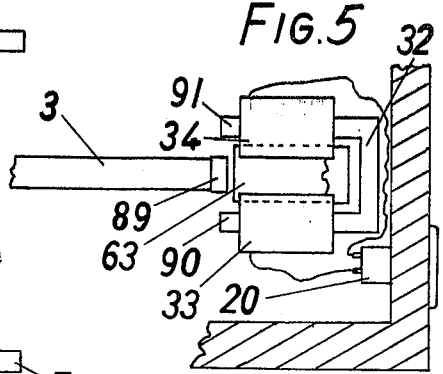
FIGS. 5 and 6 are detail views in cross section of modified versions of the transducer and are taken on the same plane as FIG. 1.

Various types of transducers may be used with the invention. Depending on the sensitivity desired and the voltage output requirements, one of three most common principles has been found to be practical in most instances. The piezoelectric principle has been demonstrated, and FIG. 5 illustrates the application of a variable reluctance unit. In this detail view the right end of the balanced beam vibrator 3 is juxtaposed between the open end of a U-shaped ferrous yoke 32. The two legs 90 and 91 of the U-shaped yoke pass through the coils 33 and 34, respectively, and the magnetic lines of force of a permanent magnet 63 enter the base of said yoke, pass through the two coil cores, permeate the end of beam 3 and reenter the opposite end of the magnet. The oscillating motion of the beam 3 alternately moves the ferrule 89, secured to the end of beam 3, toward the two ends of the yoke 32. The reluctance of the magnetic circuit fluctuates with the oscillations of the ferrule and a voltage is thereby generated in the two coils 32 and 33, said voltage being terminated in the output jack 20. In this version of the invention the beam 3 is balanced in its center position only by the weight of post 5 and table 8.

Figure 6:
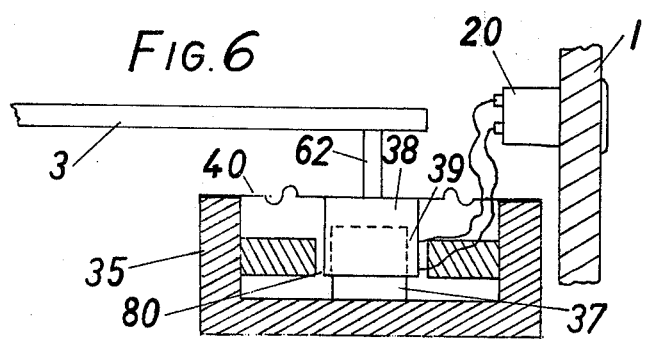

A dynamic or moving coil transducer is shown in FIG. 6. In this detail view the end of beam 3 is coupled directly to the upper end of a cylindrical paper core 38 by means of a stem 62, said stem being composed of a semiresilient substance and cemented at its top end to the beam 3 and at its bottom end to the top of core 38. Said core is supported by a resilient, circular web 40. The thin, fabric web 40 is cemented around its perimeter to a cup shaped ferrous frame 35. A cylindrical permanent magnet 37 is secured at its base to the bottom center of the frame 35 and extends upward into the core 38. A coil 39 is wound onto the core 38 and is suspended in the magnetic gap 80 of the frame 35 and magnet 37 by the resilient web 40. When the beam 3 vibrates, its motions are transmitted via the stem 62 to the core 38 and coil 39. The magnetic lines of force of the magnet cutting through the moving coil generate a voltage in the coil which is proportionate to the intensity of the beam's movements. This generated voltage is terminated in the output jack 20.

It has been shown herein that this invention will apply to a broad range of force measurements, and that any type of force, when exerted against the applicator means described throughout this specification, will be converted directly into an electric signal which may be communicated by common interconnecting cable means to an indicating instrument, amplifier, recorder, computer or other device such as a relay or solinoid valve. FIG. 10 is a block diagram illustrating how the invention may be connected to one or more such devices, indicated generally by the numerals 57, 58, and 59.

The scope and parameters of this invention will appear to those skilled in the related arts and it will be obvious that the sensitivity of the sensor may be enhanced by designing the vibrator and the transducer to resonate at a common frequency which will coincide with the frequency of the exciter means.

I claim:

1. A force measuring mechanism comprising: support means, a vibrator means pivotably secured relative to said support means to vibrate about an axis normal to its longitudinal axis and having an elongated slot centered in and transversing its longitudinal axis, a vibrator exciter means secured relative to said support means in space relation to said vibrator means, a transducer means secured relative to said support means in space relation to said vibrator means, said transducer means being responsive to the oscillating movements of said vibrator means to produce an electric signal, force bearing means comprising a post or the like, a yoke interposed between said post and said vibrator straddling said slot and engaging said vibrator at equal and opposite points about said slot, said yoke being underslung through its longitudinal center to pass through said slot and having a bearing surface which coincides in space with said longitudinal axis, said post engaging said bearing surface to bring to bear a force upon said vibrator via said yoke to dampen the vibrating motions of said vibrator.

* * * * *